US008688682B2

(12) United States Patent
Faunce et al.

(10) Patent No.: US 8,688,682 B2
(45) Date of Patent: Apr. 1, 2014

(54) QUERY EXPRESSION EVALUATION USING SAMPLE BASED PROJECTED SELECTIVITY

(75) Inventors: Michael S. Faunce, Rochester, MN (US); Yasunobu Suginaka, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1333 days.

(21) Appl. No.: 11/690,156

(22) Filed: Mar. 23, 2007

(65) Prior Publication Data

US 2008/0235181 A1 Sep. 25, 2008

(51) Int. Cl.
*G06F 17/30* (2006.01)
*G06F 7/00* (2006.01)

(52) U.S. Cl.
CPC ................................ *G06F 17/30442* (2013.01)
USPC ........................................ 707/713; 707/719

(58) Field of Classification Search
CPC ............................................... G06F 17/30442
See application file for complete search history.

(56) References Cited

U.S. PATENT DOCUMENTS

| 4,829,427 | A | | 5/1989 | Green |
| 4,956,774 | A | * | 9/1990 | Shibamiya et al. ................... 1/1 |
| 5,091,852 | A | | 2/1992 | Tsuchida et al. |
| 5,930,785 | A | | 7/1999 | Lohman et al. |
| 6,381,616 | B1 | | 4/2002 | Larson et al. |
| 6,567,804 | B1 | | 5/2003 | Ramasamy et al. |
| 6,697,961 | B1 | | 2/2004 | Petrenko et al. |
| 6,721,724 | B1 | | 4/2004 | Galindo-Legaria et al. |
| 6,748,392 | B1 | | 6/2004 | Galindo-Legaria et al. |
| 6,968,330 | B2 | * | 11/2005 | Edwards et al. ....................... 1/1 |
| 7,363,299 | B2 | * | 4/2008 | Dalvi et al. ............................ 1/1 |
| 2003/0009446 | A1 | * | 1/2003 | Agarwal et al. .................. 707/2 |
| 2005/0065921 | A1 | * | 3/2005 | Hrle et al. .......................... 707/3 |
| 2005/0097078 | A1 | * | 5/2005 | Lohman et al. ................... 707/2 |
| 2005/0108204 | A1 | * | 5/2005 | Gordon ............................. 707/3 |
| 2008/0201295 | A1 | * | 8/2008 | Praveena et al. ................. 707/2 |
| 2008/0235181 | A1 | | 9/2008 | Faunce et al. |

OTHER PUBLICATIONS

IBM, "Transformation of a DNF Bit Map to a CNF Bit Map", Ip.com Prior Art Database, Jul. 8, 2004, pp. 1-2, USA.
Claussen et al., "Optimization and Evaluation of Disjunctive Queries," Knowledge and Data Engineering, IEEE Transactions, vol. 12, No. 2, Mar./Apr. 2000, pp. 238-260.
"Database Systems Query Processing cont'd," http://sky.fit.qut.edu.au/~milliner/itb_n_232/lectures/lect005wk6.ppt, downloaded Nov. 29, 2007, 34 pages.

* cited by examiner

*Primary Examiner* — Christyann Pulliam
*Assistant Examiner* — Charles Adams
(74) *Attorney, Agent, or Firm* — Biggers Kennedy Lenart Spraggins, LLP (57) ABSTRACT

Methods, systems, and computer program products are provided for query expression evaluation for query optimization. Embodiments include receiving a query including a plurality of predicates; creating a truth table representing the possible solutions to the query; identifying a plurality of intersections of the truth table, the plurality of intersections including each predicate of the query; assigning a selectivity factor to each predicate; determining in dependence upon the selectivity factors for each predicate a selectivity rating for each of the intersections of the truth table; selecting one or more of the intersections in dependence upon the selectivity rating; and determining in dependence upon the selected intersections a percentage of rows in a database table returned by the query; and providing the percentage of rows in the database table to an access plan generator for query optimization.

17 Claims, 9 Drawing Sheets

QUERY EXPRESSION EVALUATION USING SAMPLE BASED PROJECTED SELECTIVITY

BACKGROUND OF THE INVENTION

1. Field of the Invention

The field of the invention is data processing, or, more specifically, methods, apparatus, and products for query expression evaluation for query optimization.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Information stored on a computer system is often organized in a structure called a database. A relational database is a grouping of related structures called 'tables,' which in turn are organized in rows of individual data elements. The rows are often referred to as 'records,' and the individual data elements are referred to as 'fields.' In this specification generally, therefore, an aggregation of fields is referred to as a 'data structure' or a 'record,' and an aggregation of records is referred to as a 'table.' An aggregation of related tables is called a 'database.'

A computer system typically operates according to computer program instructions in computer programs. A computer program that supports access to information in a relational database is typically called a database management system or a 'DBMS.' A DBMS is responsible for helping other computer programs access, manipulate, and save information in a database.

A DBMS typically supports access and management tools to aid users, developers, and other programs in accessing information in a database. One such tool is the structured query language, 'SQL.' SQL is query language for requesting information from a database. Although there is a standard of the American National Standards Institute ('ANSI') for SQL, as a practical matter, most versions of SQL tend to include many extensions. Here is an example of a database query expressed in SQL:

```
select * from stores, transactions
where stores.location = "Minnesota"
and stores.storeID = transactions.storeID
```

This SQL query accesses information in a database by selecting records from two tables of the database, one table named 'stores' and another table named 'transactions.' The records selected are those having value "Minnesota" in their store location fields and transactions for the stores in Minnesota. In retrieving the data for this SQL query, an SQL engine will first retrieve records from the stores table and then retrieve records from the transaction table. Records that satisfy the query requirements then are merged in a 'join.'

Each SQL query is carried out by a sequence of database operations specified as an access plan. An access plan generator creates an access plan for a query. An access plan generator uses an optimizer to optimize the execution of SQL queries against the DBMS based upon database statistics. Another database management statistic useful in creating an access plan includes the percentage of rows of a database table returned by a query. Such information may be used for example in determining whether an access plan includes retrieving a record using a tablescan or an index.

SUMMARY OF THE INVENTION

Methods, systems, and computer program products are provided for query expression evaluation for query optimization. Embodiments include receiving a query including a plurality of predicates; creating a truth table representing the possible solutions to the query; identifying a plurality of intersections of the truth table, the plurality of intersections including each predicate of the query; assigning a selectivity factor to each predicate such as by probing database statistics; determining in dependence upon the selectivity factors for each predicate a selectivity rating for each of the intersections of the truth table; selecting one or more of the intersections in dependence upon the selectivity rating; and determining in dependence upon the selected intersections a percentage of rows in a database table returned by the query; and providing the percentage of rows in the database table to an access plan generator for query optimization.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
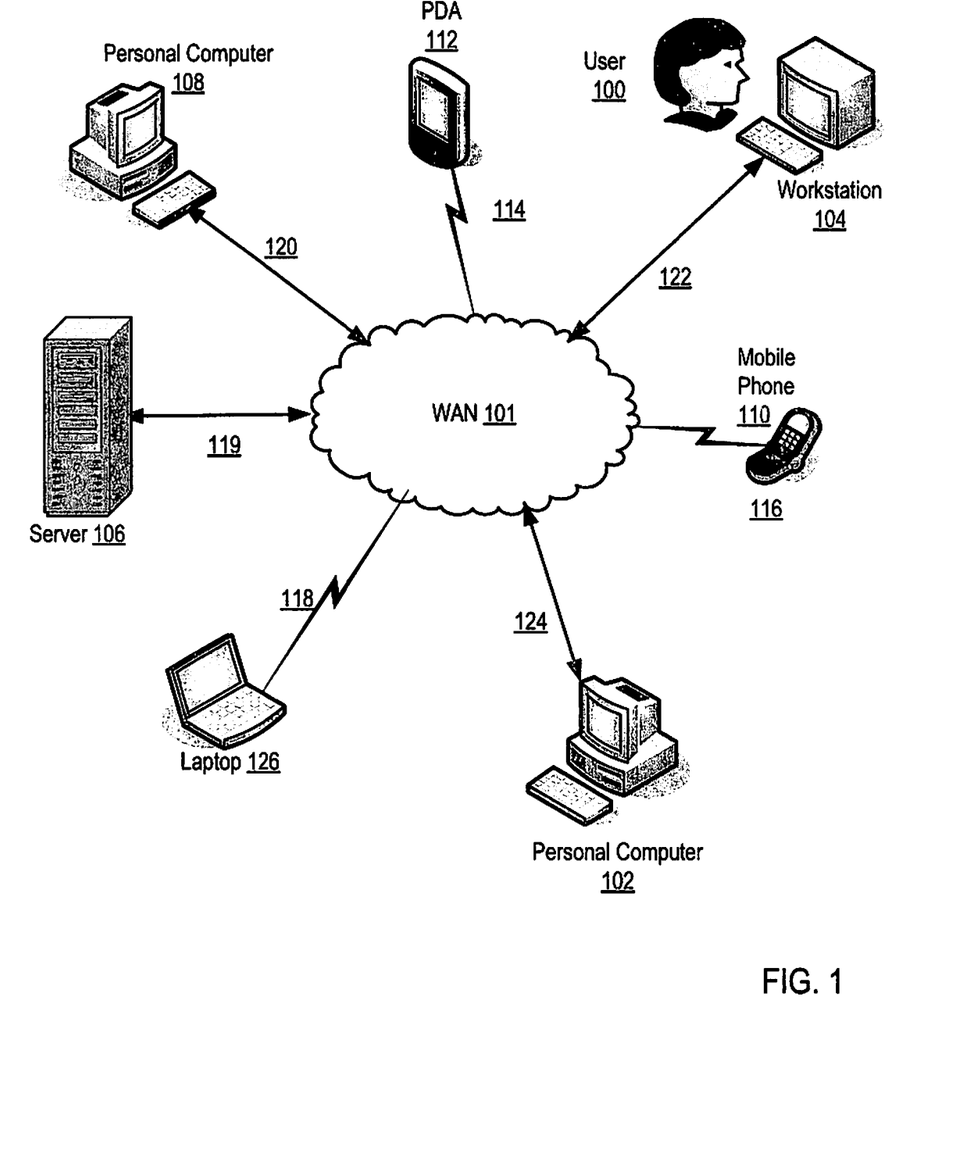
FIG. 1 sets forth a network diagram of a system for query expression evaluation for query optimization according to embodiments of the present invention.

Exemplary methods, systems, and products for query expression evaluation for query optimization in accordance with the present invention are described with reference to the accompanying drawings, beginning with FIG. 1. FIG. 1 sets forth a network diagram of a system for query expression evaluation for query optimization according to embodiments of the present invention. The system of FIG. 1 operates generally for query expression evaluation for query optimization by receiving a query including a plurality of predicates; creating a truth table representing the possible solutions to the query; identifying a plurality of intersections of the truth table, the plurality of intersections including each predicate of the query; assigning a selectivity factor to each predicate; determining in dependence upon the selectivity factors for each predicate a selectivity rating for each of the intersections of the truth table; selecting one or more of the intersections in dependence upon the selectivity rating; and determining in dependence upon the selected intersections a percentage of rows in a database table returned by the query; and providing the percentage of rows in the database table to an access plan generator for query optimization.

FIG. 1 depicts an exemplary data processing system capable of query expression evaluation for query optimization according to embodiments of the present invention. The system of FIG. 1 includes a number of computers connected for data communications in networks. Each of the computers of the system of FIG. 1 may have installed upon it a database management system capable of query expression evaluation for query optimization in accordance with the present invention. The data processing system of FIG. 1 includes wide area network ("WAN") (101). The network connection aspect of the architecture of FIG. 1 is only for explanation, not for limitation. In fact, systems for query expression evaluation for query optimization according to embodiments of the present invention may be connected as LANs, WANs, intranets, internets, the Internet, webs, the World Wide Web itself, or other connections as will occur to those of skill in the art. Such networks are media that may be used to provide data communications connections between various devices and computers connected together within an overall data processing system.

In the example of FIG. 1, several exemplary devices including a PDA (112), a computer workstation (104), a mobile phone (110), personal computer (102), a laptop (126), a server (106), and another personal computer (108) are connected to WAN (101). The network-enabled mobile phone (110) connects to WAN (101) through wireless link (116), the PDA (112) connects to network (101) through wireless link (114) and the laptop (126) connects to the network (101) through a wireless link (118). In the example of FIG. 1, the personal computer (108) connects through a wireline connection (120) to WAN (101), the computer workstation (104) connects through a wireline connection (122) to WAN (101), the personal computer (108) connects through a wireline connection (124) to WAN (101), and the server (106) connects through a wireline connection (119) to WAN (101).

In the system of FIG. 1, exemplary devices (120, 112, 104, 106, 110, 126, and 102) support a database management system capable of query expression evaluation for query optimization by receiving a query including a plurality of predicates; creating a truth table representing the possible solutions to the query; identifying a plurality of intersections of the truth table, the plurality of intersections including each predicate of the query; assigning a selectivity factor to each predicate; determining in dependence upon the selectivity factors for each predicate a selectivity rating for each of the intersections of the truth table; selecting one or more of the intersections in dependence upon the selectivity rating; and determining in dependence upon the selected intersections a percentage of rows in a database table returned by the query; and providing the percentage of rows in the database table to an access plan generator for query optimization.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
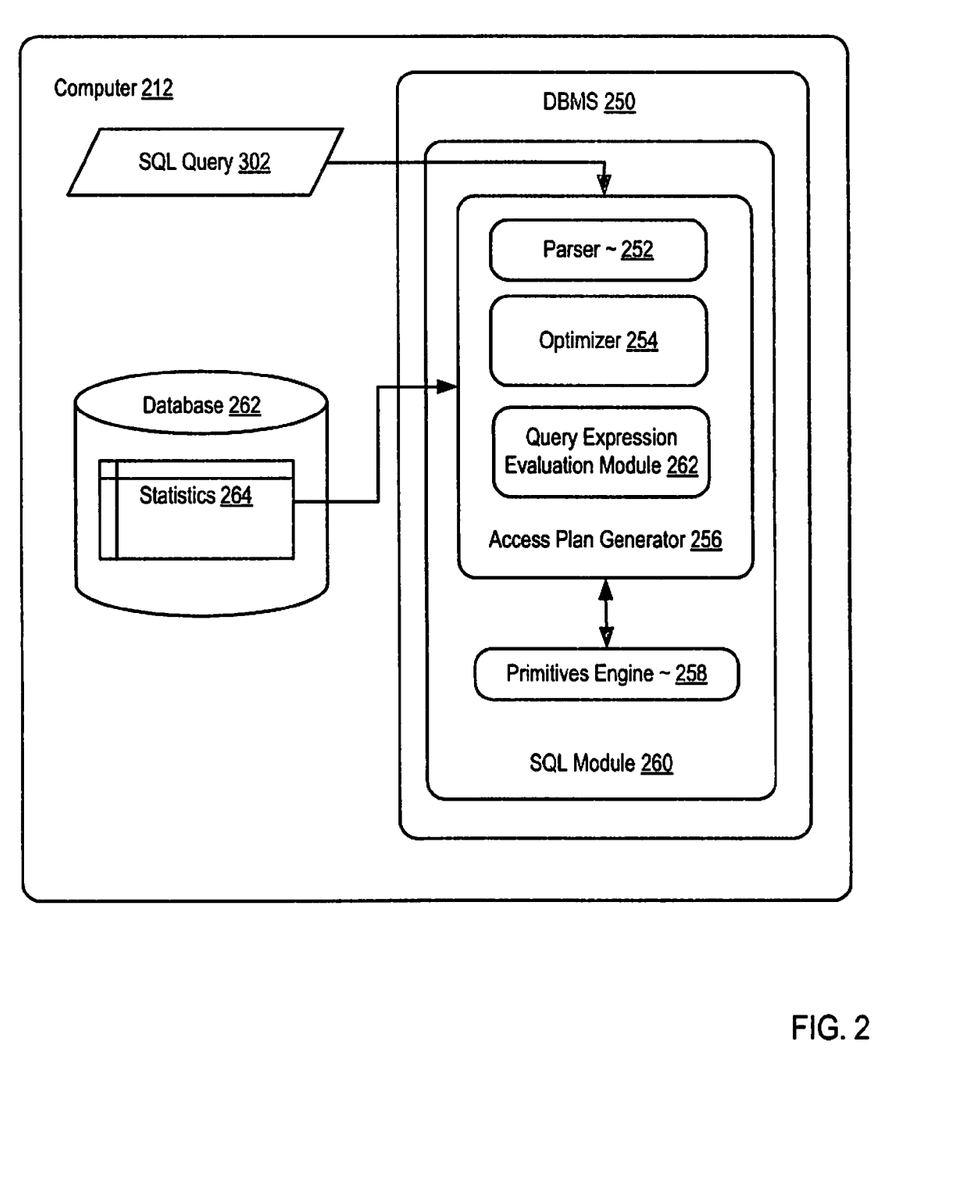
FIG. 2 sets forth a block diagram of an exemplary system for query expression evaluation for query optimization in accordance with the present invention according to embodiments of the present invention.

For further explanation, FIG. 2 sets forth a block diagram of an exemplary system for query expression evaluation for query optimization in accordance with the present invention according to embodiments of the present invention. The system of FIG. 2 includes a computer (212) having installed upon it a database management system ('DBMS') (250). DBMS (250) administers access to the contents of the database (262). The DBMS (250) includes an SQL module (260). The SQL module is implemented as computer program instructions that execute a SQL query (302).

The exemplary SQL module (260) of FIG. 2 also includes an exemplary access plan generator (256). Each SQL query is carried out by a sequence of database operations specified as an access plan. The access plan generator of FIG. 2 is implemented as computer program instructions that create an access plan for a SQL query. An access plan is a description of database functions for execution of an SQL query. Taking the following SQL query as an example:

```
select * from stores, transactions
where stores.storeID = transactions.storeID,
``` access plan generator (256) may generate the following exemplary access plan for this SQL query:

```
tablescan stores
join to
index access of transactions
```

This access plan represents database functions to scan through the stores table and, for each stores record, join all transactions records for the store. The transactions for a store are identified through the storeID field acting as a foreign key. The fact that a selection of transactions records is carried out for each store record in the stores table identifies the join function as iterative.

The exemplary access plan generator (256) of FIG. 2 includes a parser (252) for parsing the SQL query. Parser (252) is implemented as computer program instructions that parse the SQL query. A SQL query is presented to SQL module (260) in text form, the parameters of an SQL command. Parser (252) retrieves the elements of the SQL query from the text form of the query and places them in a data structure more useful for data processing of an SQL query by an SQL module.

The exemplary access plan generator (256) also includes an optimizer (254) implemented as computer program instructions that optimize the access plan in dependence upon database management statistics (264). Optimizer (254) optimizes the execution of SQL queries against DBMS (250). Optimizer (254) is implemented as computer program instructions that optimize execution of a SQL query in dependence upon database management statistics (264). Database statistics are typically implemented as metadata of a table, such as, for example, metadata of tables of database (262) or metadata of database indexes. Database statistics may include, for example:

histogram statistics: a histogram range and a count of values in the range, frequency statistics: a frequency of occurrence of a value in a column, and Cardinality statistics: a count of the number of different values in a column.

These three database statistics are presented for explanation only, not for limitation.

Another statistic useful in creating an access plan is the percentage of rows of a database table returned by a query. The access plan generator (256) of FIG. 2 includes a query expression evaluation module (262) that returns to an access plan generator the percentage of rows of a database table returned by a query. The query expression evaluation module include computer program instructions capable of: receiving a query including a plurality of predicates; creating a truth table representing the possible solutions to the query; identifying a plurality of intersections of the truth table, the plurality of intersections including each predicate of the query; assigning a selectivity factor to each predicate; determining in dependence upon the selectivity factors for each predicate a selectivity rating for each of the intersections of the truth table; selecting one or more of the intersections in dependence upon the selectivity rating; and determining in dependence upon the selected intersections a percentage of rows in a database table returned by the query; and providing the percentage of rows in the database table to an access plan generator for query optimization.

The exemplary SQL module (260) of FIG. 2 also includes a primitives engine (258) implemented as computer program instructions that execute primitive query functions in dependence upon the access plan. A 'primitive query function,' or simply a 'primitive,' is a software function that carries out actual operations on a database, retrieving records from tables, inserting records into tables, deleting records from tables, updating records in tables, and so on. Primitives correspond to parts of an access plan and are identified in the access plan. Examples of primitives include the following database instructions:

retrieve the next three records from the stores table into hash table H1 retrieve one record from the transactions table into hash table H2 join the results of the previous two operations store the result of the join in table T1

As mentioned above, query expression evaluation for query optimization in accordance with the present invention is generally implemented with computers, that is, with automated computing machinery. For further explanation, FIG. 3 sets forth a block diagram of automated computing machinery comprising a computer (152) useful in query expression evaluation for query optimization in accordance with the present invention. The computer (152) of FIG. 3 includes at least one computer processor (156) or 'CPU' as well as random access memory (168) ("RAM"). Stored in RAM (168) is database management system (250). The database management system (250) of FIG. 3 includes an SQL module (260), which in turn includes an access plan generator (256) and a primitives engine (258).

Figure 3:
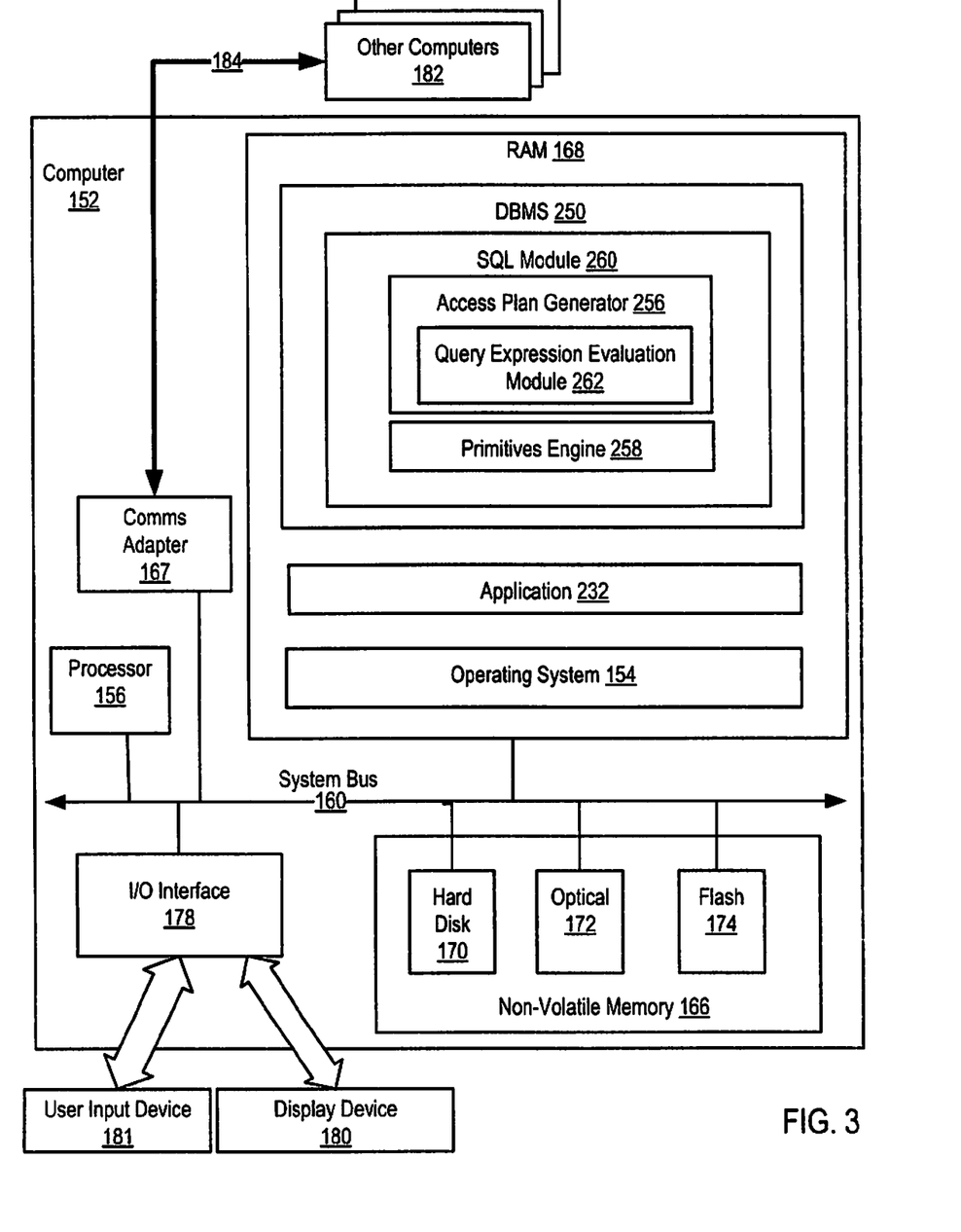
FIG. 3 sets forth a block diagram of automated computing machinery comprising a computer useful in query expression evaluation for query optimization in accordance with the present invention.

The access plan generator (256) of FIG. 3 includes a query expression evaluation module (262) that returns to an access plan generator the percentage of rows of a database table returned by a query. The query expression evaluation module include computer program instructions capable of: receiving a query including a plurality of predicates; creating a truth table representing the possible solutions to the query; identifying a plurality of intersections of the truth table, the plurality of intersections including each predicate of the query; assigning a selectivity factor to each predicate; determining in dependence upon the selectivity factors for each predicate a selectivity rating for each of the intersections of the truth table; selecting one or more of the intersections in dependence upon the selectivity rating; and determining in dependence upon the selected intersections a percentage of rows in a database table returned by the query; and providing the percentage of rows in the database table to an access plan generator for query optimization.

Also stored in RAM (168) is an application (232), a computer program that uses the DBMS (250) to access data stored in a database. Also stored in RAM (168) is an operating system (154). Operating systems useful in computers according to embodiments of the present invention include Unix, Linux, Microsoft NT™, i5OS, and many others as will occur to those of skill in the art. Operating system (154), DBMS (250), and application (154) in the example of FIG. 3 are shown in RAM (168), but many components of such software typically are stored in non-volatile memory (166) also.

The computer (152) of FIG. 3 includes non-volatile computer memory (166) coupled through a system bus (160) to processor (156) and to other components of the computer. Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The exemplary computer (134) of FIG. 3 includes a communications adapter (167) for implementing connections for data communications (184), including connections through networks, to other computers (182), including servers, clients, and others as will occur to those of skill in the art. Communications adapters implement the hardware level of connections for data communications through which local devices and remote devices or servers send data communications directly to one another and through networks. Examples of communications adapters useful according to embodiments of the present invention include modems for wired dial-up connections, Ethernet (IEEE 802.3) adapters for wired LAN connections, and 802.11b adapters for wireless LAN connections.

The example computer of FIG. 3 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

Figure 4:
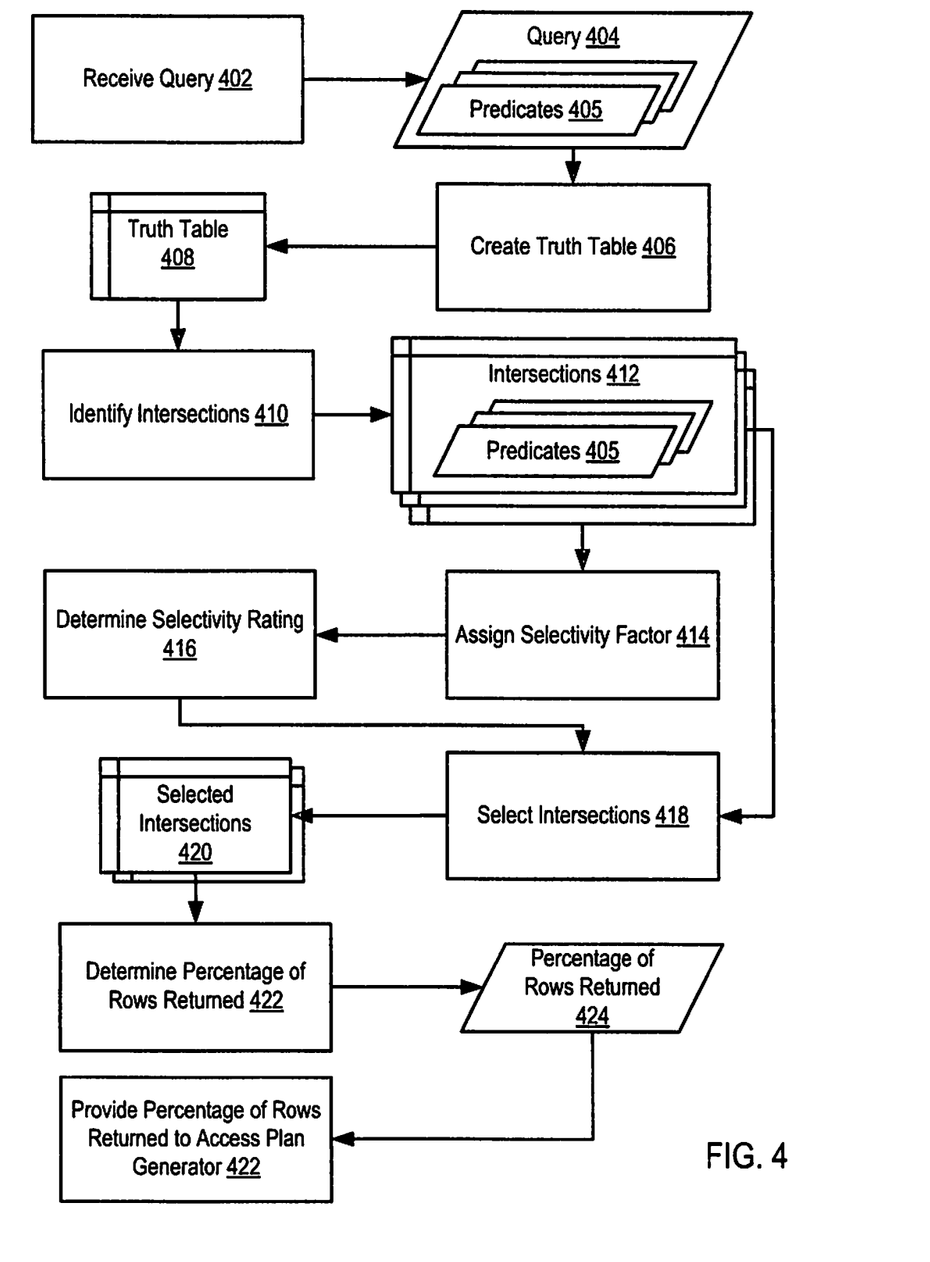
FIG. 4 sets forth a flow chart illustrating an exemplary method for query expression evaluation for query optimization according to embodiments of the present invention.

For further explanation, FIG. 4 sets forth a flow chart illustrating an exemplary method for query expression evaluation for query optimization according to embodiments of the present invention. The method of FIG. 4 includes receiving (402) a query (404) including a plurality of predicates (405). The query may be represented in a query language such as for example, the Structured Query Language ('SQL'). The query is typically received in an optimizer and transformed into several different logical expressions by rearranging and regrouping predicates that constitute the query. The logical expressions are often arranged for efficient evaluation for developing an access plan.

The method of FIG. 4 includes creating (406) a truth table (408) representing the possible solutions to the query (404). A truth table is a mathematical table used in logic to compute the functional values of logical expressions. The values in the truth tables for such logical expressions are limited to Boolean logical values such as false and true typically represented as 0 or 1, respectively. Consider for example the following query expression:

(C1=2 OR C2>4) AND (C3=6 OR C4<=8)

and truth table representing the possible solutions to the query expression:

| Truth Table of Possible Solutions to Query Expression: (C1 = 2 OR C2 > 4) AND (C3 = 6 OR C4 <= 8) | | | | | |
|---|---|---|---|---|---|
| Row Number | A C1 = 2 | B C2 > 4 | C C3 = 6 | D C4 <= 8 | T/F |
| 0 | 0 | 0 | 0 | 0 | F |
| 1 | 0 | 0 | 0 | 1 | F |
| 2 | 0 | 0 | 1 | 0 | F |
| 3 | 0 | 0 | 1 | 1 | F |
| 4 | 0 | 1 | 0 | 0 | F |
| 5 | 0 | 1 | 0 | 1 | T |
| 6 | 0 | 1 | 1 | 0 | T |
| 7 | 0 | 1 | 1 | 1 | T |
| 8 | 1 | 0 | 0 | 0 | F |
| 9 | 1 | 0 | 0 | 1 | T |
| 10 | 1 | 0 | 1 | 0 | T |
| 11 | 1 | 0 | 1 | 1 | T |
| 12 | 1 | 1 | 0 | 0 | F |
| 13 | 1 | 1 | 0 | 1 | T |
| 14 | 1 | 1 | 1 | 0 | T |
| 15 | 1 | 1 | 1 | 1 | T |

In the example above, the query expression contains four predicates C1=2, C2>4, C3=6, and C4<=8 labeled A, B, C, and D respectively. The truth table representing this four predicate query includes sixteen possible solutions to the query in rows 0-15.

Truth tables representing the possible solutions to query expressions may be further simplified or condensed as a plurality of intersections of the query expression. The method of FIG. 4, therefore, includes identifying (410) a plurality of intersections (412) of the truth table (408). For further explanation consider the following set of intersections condensing the truth table representing the possible solutions to the query expression (C1=2 OR C2>4) AND (C3=6 OR C4<=8):

| Intersections of Truth Table for Query: (C1 = 2 OR C2 > 4) AND (C3 = 6 OR C4 <= 8) | | | | |
|---|---|---|---|---|
| Intersection Number | A C1 = 2 | B C2 > 4 | C C3 = 6 | D C4 <= 8 |
| 1 | X | 1 | X | 1 |
| 2 | X | 1 | 1 | X |
| 3 | 1 | X | X | 1 |
| 4 | 1 | X | 1 | X |

The semantics of the intersections of the truth table differ from those of the truth table itself in that a value of 1 indicates that a predicate is true while a value of X indicates a disregard for the whether the predicate is true or false. That is, X is a 'do not care' with respect to whether the predicate is true or false.

The plurality of intersections (412) above includes each predicate (405) of the query (404) and also implicitly includes the relationships among the predicates (405). The plurality of intersections maintain the relationship among the predicates because each intersection explicitly includes a true solution and implicitly includes other true solutions. For example, intersection row 1 above includes the true solution B (C2>4) AND D (C4<=8) each represented as true by a value of '1' thereby making the query relationship true and implicitly maintains other true solutions because predicates A (C1=2) and C (C3=6) may be either true or false respectively because the value of 'X' in the intersections representing either true or false.

The method of FIG. 4 includes assigning (414) a selectivity factor to each predicate (405). The selectivity factor it typically implemented as a percentage of rows in the database table for which the predicate is true. Assigning (414) a selectivity factor to each predicate (404) may be carried out by probing database statistics. Examples of database statistics useful in assigning a selectivity factor include histogram statistics, frequency statistics, cardinality statistics and others as will occur to those of skill in the art. Histogram statistics include a histogram range and a count of values in the range. Frequency statistics include a frequency of occurrence of a value in a column, and cardinality statistics include a count of the number of different values in a column.

Consider for example the following exemplary intersections having predicates assigned a selectivity factor.

| Intersections of Truth Table for Query Expression: (C1 = 2 OR C2 > 4) AND (C3 = 6 OR C4 <= 8) | | | | |
|---|---|---|---|---|
| Intersection Number | A C1 = 2 Selectivity Factor = .2 | B C2 > 4 Selectivity Factor = .7 | C C3 = 6 Selectivity Factor = .6 | D C4 <= 8 Selectivity Factor = .3 |
| 1 | X | 1 | X | 1 |
| 2 | X | 1 | 1 | X |
| 3 | 1 | X | X | 1 |
| 4 | 1 | X | 1 | X |

In the example intersections above, each predicate A, B, C, and D have been assigned a selectivity factor equal to the percentage of rows in the database table containing the predicate. Predicate A (C1=2) is assigned a selectivity factor of 0.2 because C1=2 is true for 20 percent of the rows of the target database table. Predicate B (C2>4) is assigned a selectivity factor of 0.7 because C2>4 is true for 70 percent of the rows of the target database table. Predicate C (C3=6) is assigned a selectivity factor of 0.6 because C3=6 is true for 60 percent of the rows of the target database table. And similarly, predicate D (C4<=8) is assigned a selectivity factor of 0.3 because C4<=8 is true for 30 percent of the rows of the target database table.

The method of FIG. 4 includes determining (416) in dependence upon the selectivity factors for each predicate (405) a selectivity rating for each of the intersections (412) of the truth table (408). Determining (416) in dependence upon the selectivity factors for each predicate (405) a selectivity rating for each of the intersections (412) of the truth table (408) is typically carried out by multiplying the selectivity factors of each predicate in the intersection identified as true. As mentioned above, the value of '1' in an intersection identifies the predicate of the intersection as true.

For further explanation, consider the following exemplary intersections whose selectivity ratings have been determined.

| | A<br>C1 = 2 | B<br>C2 > 4 | C<br>C3 = 6 | D<br>C4 <= 8 | |
|---|---|---|---|---|---|
| Inter-<br>section<br>Number | Selectivity<br>Factor =<br>.2 | Selectivity<br>Factor = .7 | Selectivity<br>Factor = .6 | Selectivity<br>Factor = .3 | Selec-<br>tivity<br>Rating |
| 1 | X | 1 | X | 1 | .21 |
| 2 | X | 1 | 1 | X | .42 |
| 3 | 1 | X | X | 1 | .06 |
| 4 | 1 | X | 1 | X | .12 |

Intersections of Truth Table for Query Expression: (C1 = 2 OR C2 > 4) AND (C3 = 6 OR C4 <= 8)

In the example above, the selectivity rating of intersection 1 is determined to be 0.21 or 21 percent by multiplying the selectivity factor of predicate B (selectivity factor=0.7) by the selectivity factor of predicate D (selectivity factor=0.3), the predicates (B and D) having been identified as true in intersection 1. The selectivity rating of intersection 2 in the example above is determined to be 0.42 or 42 percent by multiplying the selectivity factor of predicate B (selectivity factor=0.7) by the selectivity factor of predicate C (selectivity factor=0.6), the predicates (B and C) having been identified as true in intersection 2. The selectivity rating of intersection 3 in the example above is determined to be 0.06 or 6 percent by multiplying the selectivity factor of predicate A (selectivity factor=0.2) by the selectivity factor of predicate D (selectivity factor=0.3), the predicates (A and D) having been identified as true in intersection 3. Similarly, the selectivity rating of intersection 4 in the example above is determined to be 0.12 or 12 percent by multiplying the selectivity factor of predicate A (selectivity factor=0.2) by the selectivity factor of predicate C (selectivity factor=0.6), the predicates (A and C) having been identified as true in intersection 4.

The method of FIG. 4 includes selecting (418) one or more of the intersections (412) in dependence upon the selectivity rating. Selecting (418) one or more of the intersections (412) in dependence upon the selectivity rating may be carried out using a tiered methodology as described below. The methods of selecting intersections in dependence upon selectivity ratings is said to be tiered for ease explanation. The methods are described as tiered because each method may be used and they may be used in order of complexity from the least complex first-tier method to a more complex third-tier method.

Figure 5:
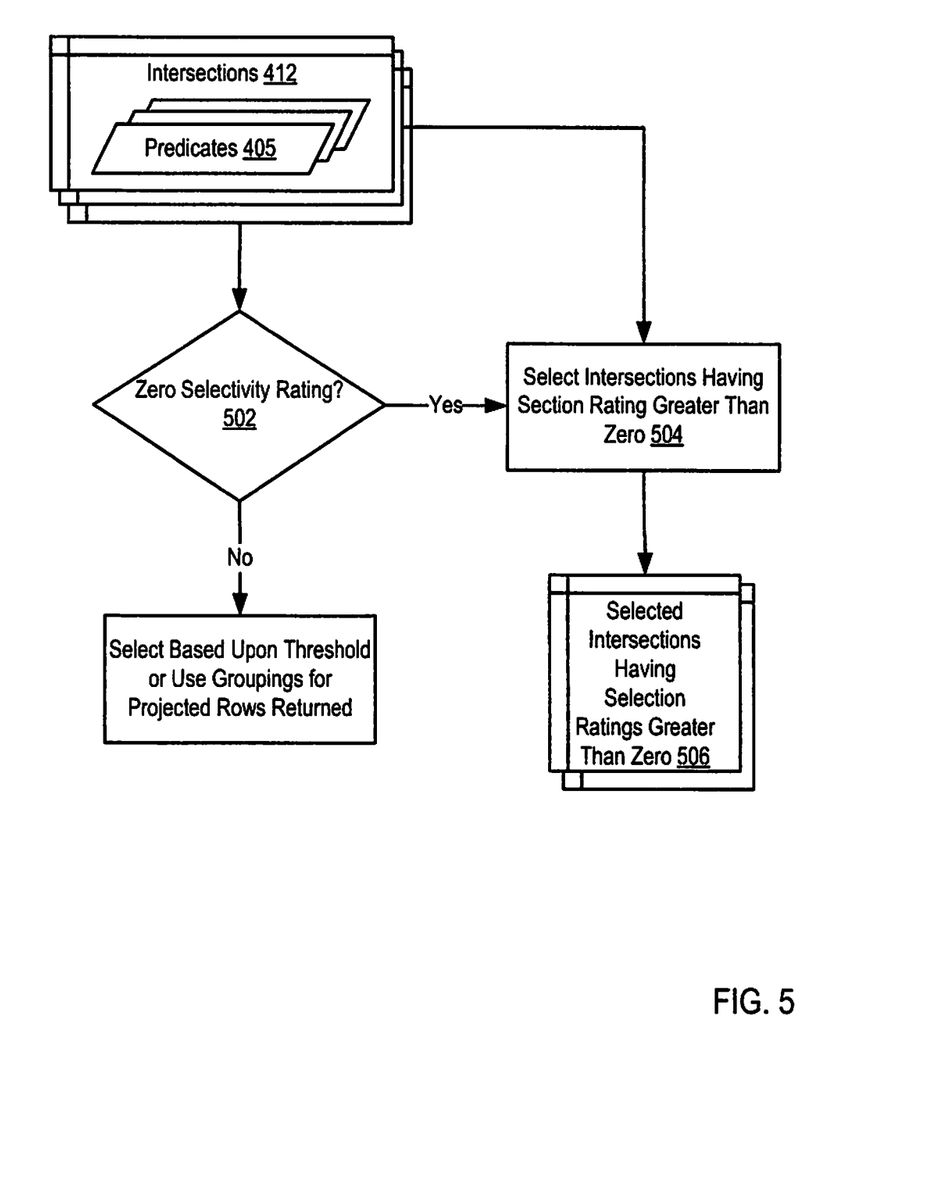
FIG. 5 sets forth a flow chart illustrating an exemplary first-tier method for selecting one or more of the intersections in dependence upon the selectivity rating.

A first-tiered method of selecting (418) one or more of the intersections (412) in dependence upon the selectivity rating may be carried out by determining whether any of the intersections has a selectivity rating of zero and selecting the intersections having a selection rating greater than zero if any of the intersections has a selectivity rating of zero as described below with reference to FIG. 5.

In some cases, there may be few or no intersections having a selectivity rating of zero but there may be enough intersections having relatively low selectivity ratings that a threshold may be used to select intersections according to the present invention. In such cases, a second-tier methodology uses a threshold greater than zero and in such a second-tier methodology selecting one or more of the intersections in dependence upon the selectivity rating may be carried out by determining whether any of the intersections has a selectivity rating greater than a threshold and selecting the intersections having a selectivity rating greater than the threshold if any of the intersections has a selectivity rating greater than the threshold as described below with reference to FIG. 7.

In still other cases, there may be a number of intersections having relatively similar selectivity ratings. In such cases, a third-tiered methodology may be used to select intersections for determining a projected number of rows returned by the query. In such cases, selecting one or more of the intersections in dependence upon the selectivity rating is carried out by selecting a subset of intersections as described below with reference to FIG. 8. The selected subset of intersections in such embodiments is used to determine a projected percentage of rows in the database table returned by the query.

After selecting (418) one or more of the intersections (412) in dependence upon the selectivity rating, the method of FIG. 4 includes determining (422) in dependence upon the selected intersections (420) a percentage of rows (424) in a database table returned by the query (404) and providing (422) the percentage of rows (424) in the database table to an access plan generator for query optimization. In cases, where the intersections have been selected in dependence upon a threshold or selecting non-zero selectivity rated intersections, determining in dependence upon the intersections a percentage of rows in a database table returned by the query is often carried out by determining a percentage of rows in the database table returned by each of the intersections such as by probing the table itself and summing the percentage of rows in the database table returned by each of those intersections. In such cases, there are relatively few selected intersection and probing the table to determine the percentage of rows returned by the intersection is cost effective.

Alternatively, and often when there are more selected intersection such as by using the third-tier methodology for intersection selection described below, selecting one or more of the intersections in dependence upon the selectivity rating is carried out by selecting a subset of intersections and determining (422) in dependence upon the intersections (412) a percentage of rows in a database table returned by the query is carried out by determining a projected percentage of rows in the database table determined in dependence upon the subset of intersections as described below with reference to FIG. 8.

As mentioned above, selecting one or more of the intersections in dependence upon the selectivity rating may be carried out using a tiered methodology. For further explanation, FIG. 5 sets forth a flow chart illustrating an exemplary first-tier method for selecting one or more of the intersections in dependence upon the selectivity rating. The method of FIG. 5 includes determining (502) whether any of the intersections (412) has a selectivity rating of zero. If any of the intersections (412) has a selectivity rating of zero, the method of FIG.

5 includes selecting (504) the intersections (506) having a selection rating greater than zero.

For further explanation, consider the following example:

| | Intersections of Truth Table for Query Expression: (C1 = 2 OR C2 > 4) AND (C3 = 6 OR C4 <= 8) | | | | |
|---|---|---|---|---|---|
| Inter-section Number | A<br>C1 = 2<br>Selectivity Factor = .2 | B<br>C2 > 4<br>Selectivity Factor = 0 | C<br>C3 = 6<br>Selectivity Factor = .6 | D<br>C4 <= 8<br>Selectivity Factor = .3 | Selec-tivity Rating |
| 1 | X | 1 | X | 1 | 0 |
| 2 | X | 1 | 1 | X | 0 |
| 3 | 1 | X | X | 1 | .06 |
| 4 | 1 | X | 1 | X | .12 |

In the example above, the selectivity rating of intersection 1 is determined to be zero '0' by multiplying the selectivity factor of predicate B (selectivity factor=0) by the selectivity factor of predicate D (selectivity factor=0.3), the predicates (B and D) having been identified as true in intersection 1. The selectivity rating of intersection 2 in the example above is also determined to be zero ('0) by multiplying the selectivity factor of predicate B (selectivity factor=0) by the selectivity factor of predicate C (selectivity factor=0.6), the predicates (B and C) having been identified as true in intersection 2. The selectivity rating of intersection 3 in the example above is determined to be 0.06 or 6 percent by multiplying the selectivity factor of predicate A (selectivity factor=0.2) by the selectivity factor of predicate D (selectivity factor=0.3), the predicates (A and D) having been identified as true in intersection 3. Similarly, the selectivity rating of intersection 4 in the example above is determined to be 0.12 or 12 percent by multiplying the selectivity factor of predicate A (selectivity factor=0.2) by the selectivity factor of predicate C (selectivity factor=0.6), the predicates (A and C) having been identified as true in intersection 4.

In this first-tier example, two intersections, intersection 1 and intersection 2, are determined to have a selectivity rating of zero. Selecting one or more of the intersections in dependence upon the selectivity rating according to the method of FIG. 5 therefore includes selecting the intersections having a selection rating greater than zero, which in the example above are intersection 3 and intersection 4.

In many cases, after selecting the intersections having a selection rating greater than zero, or some other small threshold, there are relatively few intersections selected. For further explanation, FIG. 6 sets forth a flow chart illustrating an exemplary method for determining in dependence upon the intersections a percentage of rows in a database table returned by the query that is often useful when there are relatively few intersections selected. The method of FIG. 6 includes determining (602) a percentage of rows in the database table returned by each of the intersections (5060 having a selection rating greater than zero. Determining (602) a percentage of rows in the database table returned by each of the intersections (5060 having a selection rating greater than zero may be carried out by probing the database table itself to identify the number of rows returned by the intersection. Having determined the number of rows returned by the intersection, a percentage of rows returned by the intersection may be calculated from the number of rows returned and the total number of rows of the database table.

Figure 6:
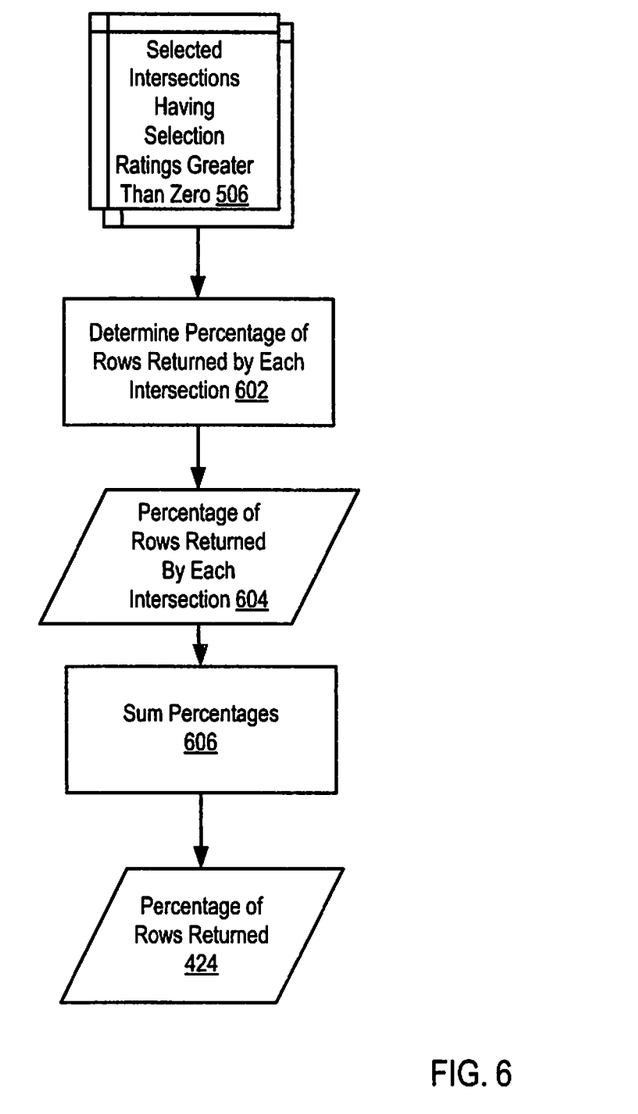
FIG. 6 sets forth a flow chart illustrating an exemplary method for determining in dependence upon the intersections a percentage of rows in a database table returned by a query that is often useful when there are relatively few intersections selected.

The method of FIG. 6 also includes summing (606) the percentage (604) of rows in the database table returned by each of the intersections (506) having a selection rating greater than zero. Summing (606) the percentage (604) of rows in the database table returned by each of the intersections (506) having a selection rating greater than zero calculates the total percentage of rows returned by the non-zero intersections.

In some relatively rare cases, only one intersection has a selection rating greater than zero. In such cases, summing (606) the percentage (604) of rows in the database table returned by each of the intersections (506) having a selection rating greater than zero includes simply summing the percentage of rows returned by that single non-zero intersection with zero.

As mentioned above, in some embodiments of the present invention, there may be few or no intersections having a selectivity rating of zero but there may be enough intersections having relatively low selectivity ratings such that a threshold may be used to select intersections according to the present invention. In such cases, a second-tier methodology may be used that includes threshold greater than zero for selecting intersections for use in determining a percentage of rows in a database table returned by the query for query optimization. For further explanation, therefore, FIG. 7 sets forth a flow chart illustrating another exemplary method for selecting one or more of the intersections in dependence upon the selectivity rating. The method of FIG. 7 includes determining (702) whether any of the intersections has a selectivity rating greater than a threshold (708). The threshold (708) is typically determined in dependence upon the collection of selectivity ratings determined for the intersections themselves. The threshold is typically established to select intersections having selectivity ratings that are orders of magnitudes greater than the selectivity ratings of non-selected intersections or the threshold is typically established such that non-selected intersections have a significantly lower selectivity rating than selected intersections.

Figure 7:
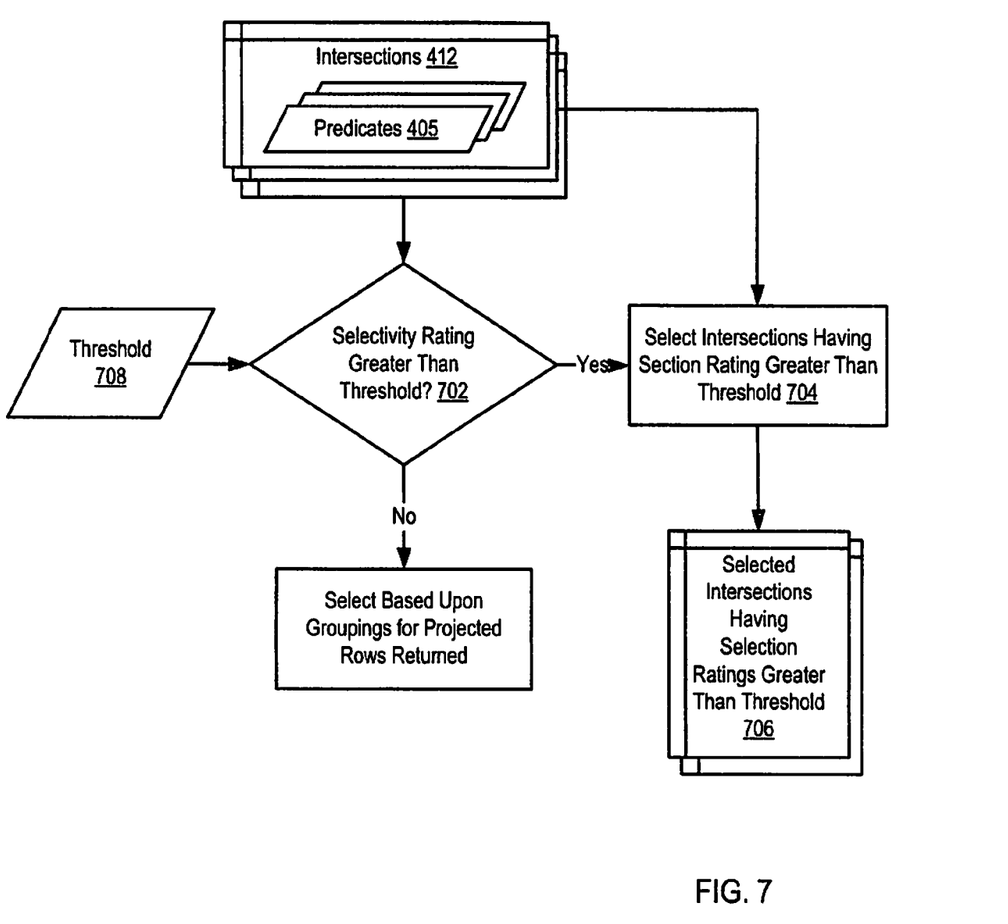
FIG. 7 sets forth a flow chart illustrating exemplary second-tier method for selecting one or more of the intersections in dependence upon a selectivity rating.

If any of the intersections has a selectivity rating greater than the threshold, the method of FIG. 7 includes selecting (704) the intersections (706) having a selectivity rating greater than the threshold (708). Selecting (704) the intersections (706) having a selectivity rating greater than the threshold (708) according to the method of FIG. 7 therefore typically results in the selection of intersections having selectivity ratings that are orders of magnitude greater than the selectivity ratings of non-selected intersections or results in the selection of intersections having a selectivity rating significantly higher than the selectivity ratings of the non-selected intersections.

For further explanation, consider the following example:

| | Intersections of Truth Table for Query Expression: (C1 = 2 OR C2 > 4) AND (C3 = 6 OR C4 <= 8) | | | | |
|---|---|---|---|---|---|
| Inter-section Number | A<br>C1 = 2<br>Selectivity Factor = .2 | B<br>C2 > 4<br>Selectivity Factor = .01 | C<br>C3 = 6<br>Selectivity Factor = .6 | D<br>C4 <= 8<br>Selectivity Factor = .3 | Selec-tivity Rating |
| 1 | X | 1 | X | 1 | .007 |
| 2 | X | 1 | 1 | X | .006 |
| 3 | 1 | X | X | 1 | .14 |
| 4 | 1 | X | 1 | X | .12 |

In the example above, the selectivity rating of intersection 1 is determined to be 0.007 or 0.7 percent by multiplying the selectivity factor of predicate B (selectivity factor=0.01) by the selectivity factor of predicate D (selectivity factor=0.7), the predicates (B and D) having been identified as true in intersection 1. The selectivity rating of intersection 2 in the example above is determined to be 0.006 or 0.6 percent by multiplying the selectivity factor of predicate B (selectivity factor=0.01) by the selectivity factor of predicate C (selectivity factor=0.6), the predicates (B and C) having been identified as true in intersection 2. The selectivity rating of intersection 3 in the example above is determined to be 0.14 or 14 percent by multiplying the selectivity factor of predicate A (selectivity factor=0.2) by the selectivity factor of predicate D (selectivity factor=0.7), the predicates (A and D) having been identified as true in intersection 3. Similarly, the selectivity rating of intersection 4 in the example above is determined to be 0.12 or 12 percent by multiplying the selectivity factor of predicate A (selectivity factor=0.2) by the selectivity factor of predicate C (selectivity factor=0.6), the predicates (A and C) having been identified as true in intersection 4.

In this first second-tier example, a threshold is established at, for example, one percent. Intersection 1 and intersection 2 are determined to have a selectivity rating below the threshold of one percent. Selecting one or more of the intersections in dependence upon the selectivity rating according to the method of FIG. 7 therefore includes selecting the intersections having a selection rating greater than the threshold of one percent, which in the example above are intersection 3 and intersection 4.

In many cases, after selecting the intersections having a selection rating greater than the threshold there are relatively few intersections selected. In such cases, determining a percentage of rows in the database table returned by each of the intersections may be carried out as described above with reference to FIG. 6.

As mentioned above, in some embodiments, there may be a number of intersections having relatively similar selectivity ratings. In such cases, a third-tiered methodology may be used to select intersections for determining a projected number of rows returned by the query. For further explanation, FIG. 8 sets forth an exemplary method for selecting one or more of the intersections in dependence upon the selectivity rating and determining in dependence upon the intersections a percentage of rows in a database table returned by the query. In the method of FIG. 8, selecting (418) one or more of the intersections in dependence upon the selectivity rating is carried out by selecting (802) a subset (804) of intersections (412), each subset (804) of intersections including each predicate (405) in the query.

For further explanation, consider the following exemplary intersections whose selectivity ratings have been determined.

Intersections of Truth Table for
Query Expression: (C1 = 2 OR C2 > 4) AND (C3 = 6 OR C4 <= 8)

| Intersection Number | A<br>C1 = 2<br>Selectivity Factor = .2 | B<br>C2 > 4<br>Selectivity Factor = .7 | C<br>C3 = 6<br>Selectivity Factor = .6 | D<br>C4 <= 8<br>Selectivity Factor = .3 | Selectivity Rating |
|---|---|---|---|---|---|
| 1 | X | 1 | X | 1 | .21 |
| 2 | X | 1 | 1 | X | .42 |
| 3 | 1 | X | X | 1 | .06 |
| 4 | 1 | X | 1 | X | .12 |

Figure 8:
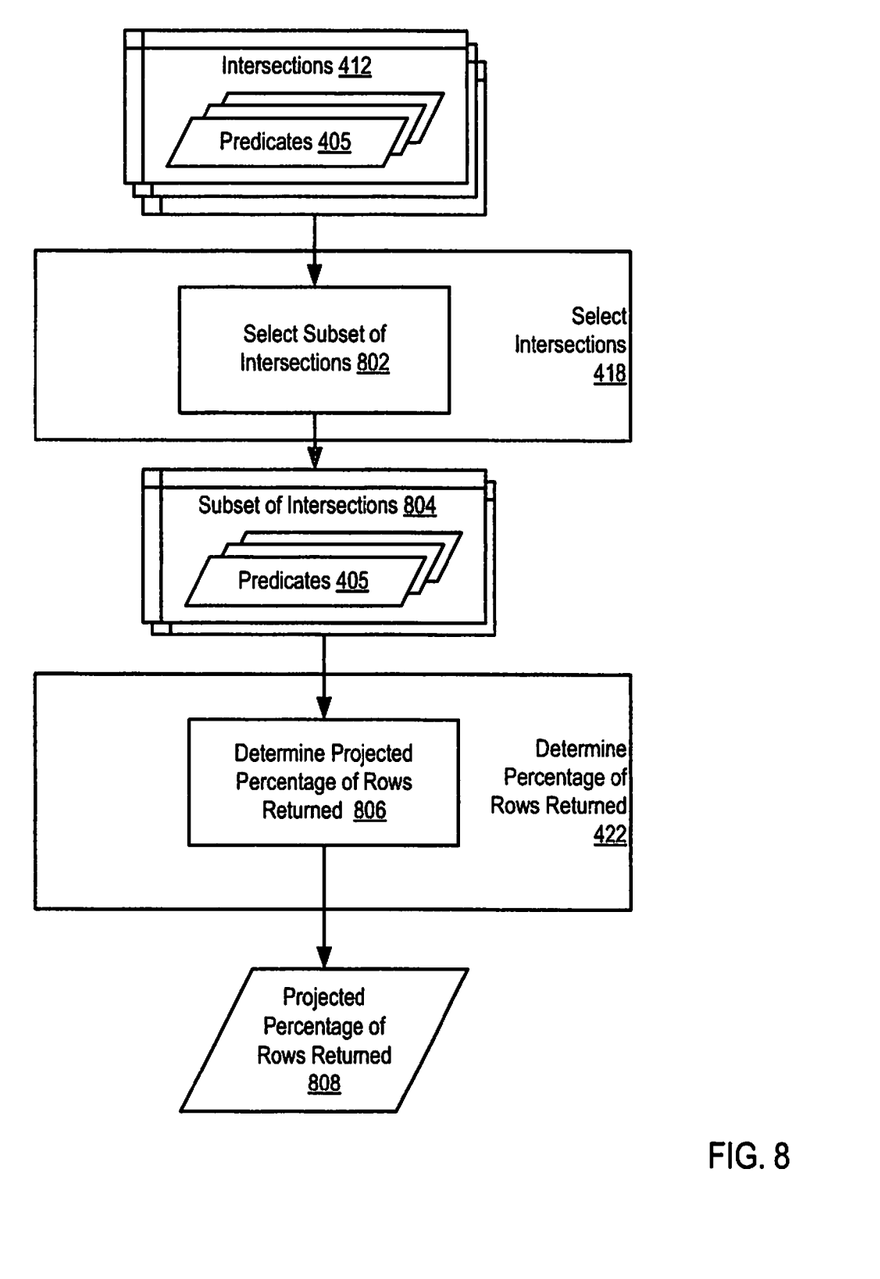
FIG. 8 sets forth an exemplary third-tier method for selecting one or more of the intersections in dependence upon the selectivity rating and determining in dependence upon the intersections a percentage of rows in a database table returned by a query.

In the example above, selecting (802) a subset (804) of intersections (412) according to the method of FIG. 8 results in selecting the subset of intersections that includes intersections 1 and intersection 4 or the subset of intersections that includes intersection 2 and intersection 3. These subsets are selected because each subset of intersections must include each predicate in the query. With this constraint, intersection 1 and intersection 4 make up a subset that includes each predicate in the query. Similarly, intersection 2 and intersection 3 make up a subset that includes each predicate in the query.

In the method of FIG. 8, determining (422) in dependence upon the intersections (412) a percentage of rows in a database table returned by the query is carried out by determining (806) a projected percentage (808) of rows in the database table determined in dependence upon the subset (804) of intersections. A projected percentage of rows in the database table returned by the query is so-called because the projected percentage it is a percentage calculated from only the chosen subset not the entirety of the intersections and therefore includes estimation.

Figure 9:
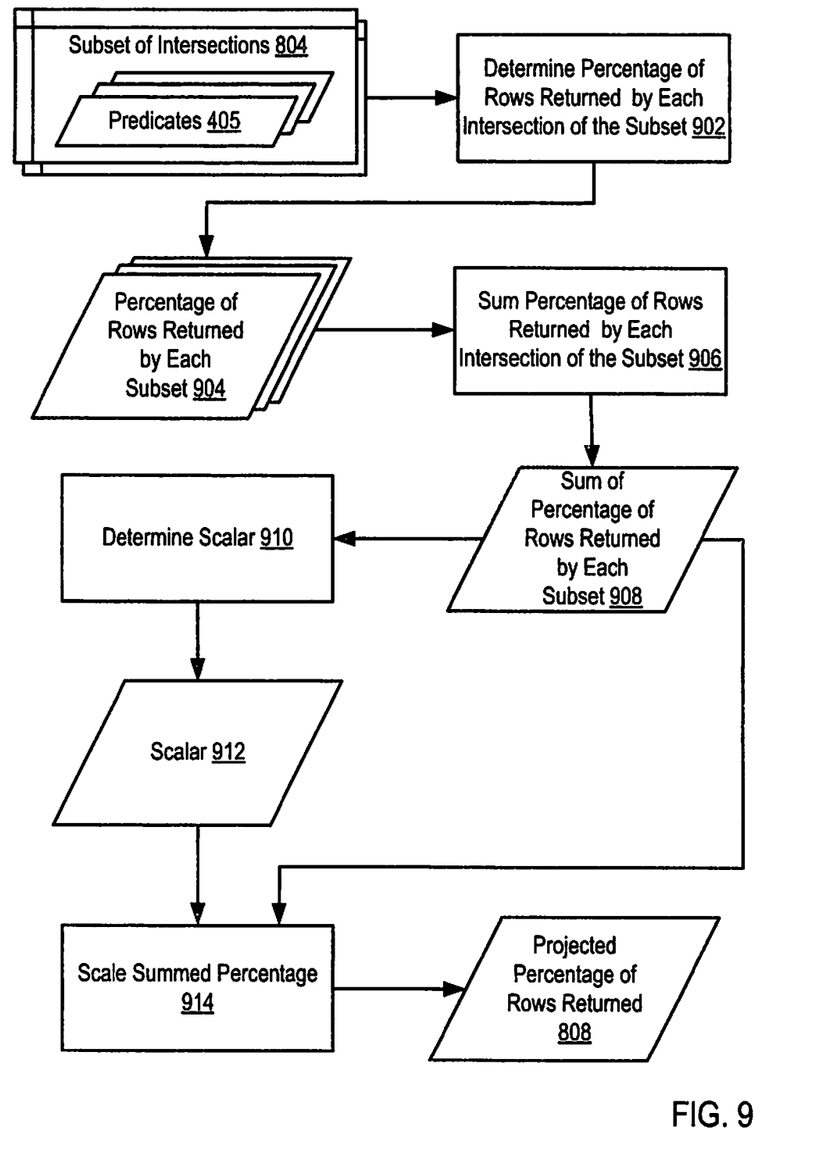
FIG. 9 sets forth a flow chart illustrating an exemplary method for determining a projected percentage of rows in the database table determined in dependence upon a subset of intersections.

For further explanation, FIG. 9 sets forth a flow chart illustrating an exemplary method for determining a projected percentage of rows in the database table determined in dependence upon the subset of intersections. The method of FIG. 9 includes determining (902) a percentage (904) of rows in the database table returned by each of the intersections of the subset (804). Determining (902) a percentage (904) of rows in the database table returned by each of the intersections of the subset (804) may be carried out by probing the database table itself to identify the number of rows returned by each intersection of the subset. Having determined the number of rows returned by each intersection, a percentage of rows returned by each intersection may be calculated from the number of rows returned by each intersection and the total number of rows of the database table.

The method of FIG. 9 also includes summing (906) the percentage (904) of rows in the database table returned by each of the intersections of the subset (804). Summing (906) the percentage (904) of rows in the database table returned by each of the intersections of the subset (804) calculates a total percentage of rows returned by the subset of the intersections.

As mentioned above, total percentage of rows returned by the subset of the intersections is calculated only from the subset. The total percentage of rows returned by the subset is therefore scaled to create a projected percentage. The method of FIG. 9 therefore also includes determining (910) a scalar (912) in dependence upon the selectivity ratings of the intersections of the subset (804) and scaling (914) the summed percentage (908) in dependence upon the scalar (912). Determining (910) a scalar (912) in dependence upon the selectivity ratings of the intersections of the subset (804) is typically carried out by summing the selectivity ratings of all the intersections and summing the selectivity ratings of the intersections in the subset, determining the ratio of the sum of the selectivity ratings of all the intersections and the sum of the selectivity ratings of the intersections of the subset. The scalar is therefore calculated according the following formula:

$$\Sigma \text{ total intersections}/[\Sigma \text{ subset}]$$

Where:
$\Sigma$ total intersections is the sum of selectivity factors of intersections; and
$\Sigma$ subset is the sum of selectivity factors of subset Example Case with Data for Determining a Projected Percentage As an aid to understanding, the following example case with data is presented for better understanding of determining a projected percentage of rows returned by a query from a subset of intersections as will occur to those of skill in the art. In this example, a ten row database table includes the following data.

| Database Table | | | | |
|---|---|---|---|---|
| Row Number | C1 | C2 | C3 | C4 |
| 0 | 1 | 1 | 7 | 12 |
| 1 | 1 | 1 | 7 | 12 |
| 2 | 2 | 1 | 6 | 12 |
| 3 | 2 | 5 | 6 | 12 |
| 4 | 3 | 5 | 7 | 4 |
| 5 | 4 | 5 | 7 | 5 |
| 6 | 7 | 5 | 6 | 6 |
| 7 | 8 | 6 | 6 | 12 |
| 8 | 9 | 7 | 6 | 13 |
| 9 | 10 | 8 | 6 | 14 |

In this example the following query expression is (C1=2 OR C2>4) AND (C3=6 OR C4<=8) is applied to the database table having the data above. The following table illustrates that the 8 of the 10 rows (80 percent) are in the result set of the query expression.

| Database Table | | | | | |
|---|---|---|---|---|---|
| Row Number | C1 | C2 | C3 | C4 | Row in Result Set? |
| 0 | 1 | 1 | 7 | 12 | N |
| 1 | 1 | 1 | 7 | 12 | N |
| 2 | 2 | 1 | 6 | 12 | Y |
| 3 | 2 | 5 | 6 | 12 | Y |
| 4 | 3 | 5 | 7 | 4 | Y |
| 5 | 4 | 5 | 7 | 5 | Y |
| 6 | 7 | 5 | 6 | 6 | Y |
| 7 | 8 | 6 | 6 | 12 | Y |
| 8 | 9 | 7 | 6 | 13 | Y |
| 9 | 10 | 8 | 6 | 14 | Y |

The intersections of a truth table representing the possible solutions to the query expression are illustrated in the chart below. The selectivity factors of each predicate in this example are determined by probing the database table above and a selectivity rating for each intersection is included in the table.

| Intersections of Truth Table for Query Expression: (C1 = 2 OR C2 > 4) AND (C3 = 6 OR C4 <= 8) | | | | | | |
|---|---|---|---|---|---|---|
| Int. # | A<br>C1 = 2<br>Selectivity<br>Factor =<br>.2 | B<br>C2 > 4<br>Selectivity<br>Factor =<br>.07 | C<br>C3 = 6<br>Selectivity<br>Factor =<br>.6 | D<br>C4 <= 8<br>Selectivity<br>Factor =<br>.03 | Select.<br>Rating | Actual<br>Probe |
| 1 | X | 1 | X | 1 | .21 | .3 |
| 2 | X | 1 | 1 | X | .42 | .5 |
| 3 | 1 | X | X | 1 | .06 | .0 |
| 4 | 1 | X | 1 | X | .12 | .2 |

Using the method of FIG. 9 a projected percentage of rows in the data base table may be determined in dependence upon a subset of two intersections, intersection 2 and intersection 3. The subset of intersection 2 and intersection 3 are chosen in this example over the subset of intersection 1 and intersection 4 because intersections 2 and 3 have higher combined selectivity rating than intersections 1 and 4.

A projected percentage of rows returned by the query determined in dependence upon a subset of intersection 2 and intersection 3 by determining a percentage of rows in the database table returned by each of the intersections of the subset. In this example, the database table is probed to determine that intersection 2 returns 0.5 or 50 percent of the rows and intersection 3 returns zero ('0') rows.

Determining a projected percentage of rows in this example includes summing the percentage of rows in the database table returned intersection 2 and intersection 3 which in this example is 0.5 or 50 percent.

Determining a projected percentage of rows in this example includes determining a scalar in dependence upon the selectivity ratings of the intersections of the subset (in this case, 0.42+0.06=0.48 percent) and scaling the summed percentage in dependence upon the scalar. Determining a scalar in dependence upon the selectivity ratings of the intersections of the subset is typically carried out by summing the selectivity ratings of all the intersections (in this case 0.21+0.42+0.06+0.12=0.81) and summing the selectivity ratings of the intersections in the subset (in this case 0.42+0.06=0.48), and determining the ratio of the sum of the selectivity ratings of all the intersections and the sum of the selectivity ratings of the intersections of the subset (in this case 0.81/0.48). The scalar is therefore calculated according the following formula:

$$\Sigma \text{ total intersections}/[\Sigma \text{ subset}$$

Where:
$\Sigma$ total intersections is the sum of selectivity factors of intersections; and
$\Sigma$ subset is the sum of selectivity factors of subset
In this case the calculated ratio is therefore 0.81/0.48
Scaling the scaling the summed percentage in dependence upon the scalar in this example therefore yields:

$$(0.81/0.48)*(0.5+0.0)=0.84$$

The example above yields a projected percentage of rows of 84 percent that is determined from probing only the subset of intersections not all the intersections. The projected percentage of rows which is 84 percent differs slightly from the actual percentage of rows in the database table above returned by the query which is 80 percent.

Exemplary embodiments of the present invention are described largely in the context of a fully functional computer system for query expression evaluation for query optimization. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for query expression evaluation for query optimization, the method comprising:
    receiving a query including a plurality of predicates;
    creating a truth table representing all of the possible solutions to the query;
    condensing the truth table including identifying a plurality of intersections of the truth table, the plurality of intersections including each predicate of the query;
    assigning a selectivity factor to each predicate;
    determining in dependence upon the selectivity factors for each predicate a selectivity rating for each of the intersections of the truth table;
    selecting one or more of the intersections in dependence upon the selectivity rating, wherein selecting one or more of the intersections in dependence upon the selectivity rating further comprises:
    determining whether any of the intersections has a selectivity rating of zero; and
    when any of the intersections has a selectivity rating of zero, selecting the intersections having a selection rating greater than zero;
    determining in dependence upon the selected intersections a percentage of rows in a database table returned by the query; and
    providing the percentage of rows in the database table to an access plan generator for query optimization.

2. The method of claim 1 wherein assigning a selectivity factor to each predicate further comprises probing database statistics.

3. The method of claim 1 wherein determining in dependence upon the intersections a percentage of rows in a database table returned by the query further comprises:
    determining a percentage of rows in the database table returned by each of the intersections having a selection rating greater than zero; and
    summing the percentage of rows in the database table returned by each of the intersections having a selection rating greater than zero.

4. The method of claim 1 wherein selecting one or more of the intersections in dependence upon the selectivity rating further comprises:
    determining whether any of the intersections has a selectivity rating greater than a threshold; and
    if any of the intersections has a selectivity rating greater than the threshold, selecting the intersections having a selectivity rating greater than the threshold.

5. The method of claim 1 wherein selecting one or more of the intersections in dependence upon the selectivity rating further comprises: selecting a subset of intersections, each subset of intersections including each predicate in the query; and
    wherein determining in dependence upon the intersections a percentage of rows in a database table returned by the query further comprises determining a projected percentage of rows in the database table determined in dependence upon the subset of intersections.

6. The method of claim 5 wherein determining a projected percentage of rows in the database table determined in dependence upon the subset of intersections further comprises:
    determining a percentage of rows in the database table returned by each of the intersections of the subset; and
    summing the percentage of rows in the database table returned by each of the intersections of the subset;
    determining a scalar in dependence upon the selectivity ratings of the intersections of the subset; and
    scaling the summed percentage in dependence upon the scalar.

7. A system for query expression evaluation for query optimization, the system comprising a computer processor, a computer memory operatively coupled to the computer processor, the computer memory having disposed within the computer memory, computer program instructions configured to:
    receive a query including a plurality of predicates;
    create a truth table representing all of the possible solutions to the query;
    condense the truth table including identifying a plurality of intersections of the truth table, the plurality of intersections including each predicate of the query;
    assign a selectivity factor to each predicate;
    determine in dependence upon the selectivity factors for each predicate a selectivity rating for each of the intersections of the truth table;
    select one or more of the intersections in dependence upon the selectivity rating, wherein selecting one or more of the intersections in dependence upon the selectivity rating further comprises:
    determining whether any of the intersections has a selectivity rating of zero; and
    when any of the intersections has a selectivity rating of zero, selecting the intersections having a selection rating greater than zero;
    determine in dependence upon the selected intersections a percentage of rows in a database table returned by the query; and
    provide the percentage of rows in the database table to an access plan generator for query optimization.

8. The system of claim 7 wherein computer program instructions configured to assign a selectivity factor to each predicate further comprise computer program instructions configured to probe database statistics.

9. The system of claim 7 wherein computer program instructions configured to determine in dependence upon the intersections a percentage of rows in a database table returned by the query further comprise computer program instructions configured to:
    determine a percentage of rows in the database table returned by each of the intersections having a selection rating greater than zero; and
    sum the percentage of rows in the database table returned by each of the intersections having a selection rating greater than zero.

10. The system of claim 7 wherein computer program instructions configured to select one or more of the intersections in dependence upon the selectivity rating further comprise computer program instructions configured to:
    determine whether any of the intersections has a selectivity rating greater than a threshold; and if any of the intersections has a selectivity rating greater than the threshold, select the intersections having a selectivity rating greater than the threshold.

11. The system of claim 7 wherein computer program instructions configured to select one or more of the intersections in dependence upon the selectivity rating further comprise computer program instructions configured to:
select a subset of intersections, each subset of intersections including each predicate in the query; and
wherein determining in dependence upon the intersections a percentage of rows in a database table returned by the query further comprises determining a projected percentage of rows in the database table determined in dependence upon the subset of intersections.

12. The system of claim 11 wherein computer program instructions configured to determine a projected percentage of rows in the database table determined in dependence upon the subset of intersections further comprise computer program instructions configured to:
determine a percentage of rows in the database table returned by each of the intersections of the subset; and
sum the percentage of rows in the database table returned by each of the intersections of the subset;
determine a scalar in dependence upon the selectivity ratings of the intersections of the subset; and
scale the summed percentage in dependence upon the scalar.

13. A computer program product including a computer readable, recordable medium, wherein the computer readable, recordable medium is not a signal, the computer program product for query expression evaluation for query optimization, the computer program product comprising computer instructions configured to:
receive a query including a plurality of predicates;
create a truth table representing all of the possible solutions to the query;
condense the truth table including identifying a plurality of intersections of the truth table, the plurality of intersections including each predicate of the query;
assign a selectivity factor to each predicate;
determine in dependence upon the selectivity factors for each predicate a selectivity rating for each of the intersections of the truth table; and
select one or more of the intersections in dependence upon the selectivity rating, wherein selecting one or more of the intersections in dependence upon the selectivity rating further comprises:
determining whether any of the intersections has a selectivity rating of zero; and
when any of the intersections has a selectivity rating of zero, selecting the intersections having a selection rating greater than zero; and
determining in dependence upon the selected intersections a percentage of rows in a database table returned by the query; and
providing the percentage of rows in the database table to an access plan generator for query optimization.

14. The computer program product of claim 13 wherein computer program instructions configured to determine in dependence upon the intersections a percentage of rows in a database table returned by the query further comprise computer program instructions configured to:
determine a percentage of rows in the database table returned by each of the intersections having a selection rating greater than zero; and
sum the percentage of rows in the database table returned by each of the intersections having a selection rating greater than zero.

15. The computer program product of claim 13 wherein computer program instructions configured to select one or more of the intersections in dependence upon the selectivity rating further comprise computer program instructions configured to:
determine whether any of the intersections has a selectivity rating greater than a threshold; and
if any of the intersections has a selectivity rating greater than the threshold, select the intersections having a selectivity rating greater than the threshold.

16. The computer program product of claim 13 wherein computer program instructions configured to select one or more of the intersections in dependence upon the selectivity rating further comprise computer program instructions configured to:
select a subset of intersections, each subset of intersections including each predicate in the query; and
wherein determining in dependence upon the intersections a percentage of rows in a database table returned by the query further comprises determining a projected percentage of rows in the database table determined in dependence upon the subset of intersections.

17. The computer program product of claim 16 wherein computer program instructions configured to determine a projected percentage of rows in the database table determined in dependence upon the subset of intersections further comprise computer program instructions configured to:
determine a percentage of rows in the database table returned by each of the intersections of the subset; and
sum the percentage of rows in the database table returned by each of the intersections of the subset;
determine a scalar in dependence upon the selectivity ratings of the intersections of the subset; and
scale the summed percentage in dependence upon the scalar.

* * * * *